(12) United States Patent
Stoneham et al.

(10) Patent No.: US 10,013,154 B2
(45) Date of Patent: *Jul. 3, 2018

(54) BROADCAST CONTROL

(71) Applicant: GRASS VALLEY CANADA, Montreal, Quebec (CA)

(72) Inventors: Mark Stoneham, Mosman (AU); David Griggs, Berowra Heights (AU); David Sabine, Collaroy (AU); Matthew Caves, Woolloomooloo (AU); Graham Broadbridge, West Pymble (AU); Michael Reznik, Maroubra (AU); Colin Grealy, Christchurch (NZ); Craig Morrison, North Island (NZ); Thomas Barnett, Chatswood (AU); Christopher McMillan, St. Ives (AU)

(73) Assignee: GRASS VALLEY CANADA, Montreal (CA)

(*) Notice: Subject to any disclaimer, the term of this patent is extended or adjusted under 35 U.S.C. 154(b) by 312 days.

This patent is subject to a terminal disclaimer.

(21) Appl. No.: 14/742,565

(22) Filed: Jun. 17, 2015

(65) Prior Publication Data
US 2015/0363077 A1  Dec. 17, 2015

Related U.S. Application Data

(63) Continuation of application No. 10/551,806, filed as application No. PCT/AU2004/000441 on Apr. 2, 2004, now Pat. No. 9,098,193.

(30) Foreign Application Priority Data

Apr. 4, 2003  (AU) ................................ 2003901532

(51) Int. Cl.
*G06F 3/0484*  (2013.01)
*G06F 3/0488*  (2013.01)
(Continued)

(52) U.S. Cl.
CPC ........ *G06F 3/04842* (2013.01); *G06F 3/0412* (2013.01); *G06F 3/0488* (2013.01);
(Continued)

(58) Field of Classification Search
CPC ............................ G06F 3/0484; G06F 3/0488
See application file for complete search history.

(56) References Cited

U.S. PATENT DOCUMENTS

| 4,514,818 A | 4/1985 | Walker |
| 4,602,286 A | 7/1986 | Kellar et al. |

(Continued)

FOREIGN PATENT DOCUMENTS

| DE | 19625954 | 1/1998 |
| EP | 360576 | 3/1990 |

(Continued)

OTHER PUBLICATIONS

International Search Report regarding EP 12177056.4, dated Jan. 20, 2014.

(Continued)

*Primary Examiner* — Daeho D Song
(74) *Attorney, Agent, or Firm* — Arent Fox LLP

(57) ABSTRACT

A broadcast control apparatus for visual data includes a touch screen (32, 34) display panel operable to receive and display visual data simultaneously in real time from a plurality of visual sources. It also includes a touch screen graphical panel for the retrieval of control functions from a control function register. The visual data from at least one of the visual sources is selectable for use by finger pressure on the associated portion of the touch screen (32, 34) display panel and the selected data is modifiable in accordance with the retrieved control function.

32 Claims, 7 Drawing Sheets

(51) Int. Cl.
*H04H 60/04* (2008.01)
*H04N 5/222* (2006.01)
*H04N 5/262* (2006.01)
*H04N 5/28* (2006.01)
*G11B 27/034* (2006.01)
*G11B 27/34* (2006.01)
*G06F 3/041* (2006.01)

(52) U.S. Cl.
CPC ...... *G06F 3/04847* (2013.01); *G06F 3/04886* (2013.01); *G11B 27/034* (2013.01); *G11B 27/34* (2013.01); *H04H 60/04* (2013.01); *H04N 5/222* (2013.01); *H04N 5/262* (2013.01); *H04N 5/28* (2013.01)

(56) References Cited

U.S. PATENT DOCUMENTS

| | | | |
|---|---|---|---|
| 4,720,805 A | 1/1988 | Vye | |
| 5,327,161 A | 7/1994 | Logan et al. | |
| 5,331,417 A * | 7/1994 | Soohoo | H04N 5/262 348/584 |
| 5,477,024 A | 12/1995 | Share et al. | |
| 5,479,205 A | 12/1995 | Silverbrook | |
| 5,685,634 A | 11/1997 | Mulligan | |
| 6,151,017 A * | 11/2000 | Suzuoka | G06F 3/04842 345/157 |
| 6,154,600 A | 11/2000 | Newman et al. | |
| 6,204,840 B1 | 3/2001 | Petelycky | |
| 6,452,612 B1 * | 9/2002 | Holtz | G06F 3/1431 348/722 |
| 6,733,449 B1 * | 5/2004 | Krishnamurthy | A61B 8/00 600/437 |
| 6,791,620 B1 * | 9/2004 | Elswick | H04N 7/01 348/441 |
| 6,952,221 B1 | 10/2005 | Holtz | |
| 7,024,677 B1 * | 4/2006 | Snyder | G11B 27/031 715/723 |
| 7,073,127 B2 | 7/2006 | Zhao et al. | |
| 7,260,241 B2 * | 8/2007 | Fukuhara | G08B 13/19602 348/143 |
| 7,325,199 B1 | 1/2008 | Reid | |
| 7,824,067 B2 | 11/2010 | Martineau et al. | |
| 7,859,571 B1 * | 12/2010 | Brown | G08B 13/19645 348/211.3 |
| 2001/0003846 A1 * | 6/2001 | Rowe | G11B 27/031 725/47 |
| 2001/0043219 A1 | 11/2001 | Robotham | |
| 2002/0059625 A1 | 5/2002 | Kurauchi | |
| 2002/0175931 A1 * | 11/2002 | Holtz | H04N 21/4622 715/705 |
| 2003/0014752 A1 * | 1/2003 | Zaslavsky | H04N 21/4316 725/40 |
| 2003/0189589 A1 * | 10/2003 | LeBlanc | G11B 27/031 715/723 |
| 2003/0204850 A1 | 10/2003 | Ng et al. | |
| 2003/0215214 A1 * | 11/2003 | Ma | G11B 27/031 386/282 |
| 2004/0001079 A1 * | 1/2004 | Zhao | G11B 27/034 715/719 |
| 2004/0021643 A1 | 2/2004 | Hoshino et al. | |
| 2004/0186379 A1 * | 9/2004 | Landry | H04L 67/12 600/437 |

FOREIGN PATENT DOCUMENTS

| | | |
|---|---|---|
| EP | 360432 | 7/1994 |
| GB | 2252473 | 8/1992 |
| JP | 9154047 | 6/1997 |
| WO | 0060852 | 10/2000 |
| WO | 0152526 | 7/2001 |

OTHER PUBLICATIONS

Patent Examination Report No. 1 dated Nov. 1, 2012, regarding Australian Application No. 2010221788.
Australian Patent Office International-Type Search Report dated Nov. 17, 2013, regarding Australian Application No. 2003901532.
European Application Serial No. 04725240.8, Supplementary European Search Report dated Mar. 22, 2010, 5 pgs.
International Application Serial No. PCT/AU2004/000441, International Search Reportdated May 4, 2004, 3 pgs.
International Application Serial No. PCT/AU2004/000441, Written Opinion dated May 4, 2004, 3 pgs.
EP Communication dated Nov. 16, 2015, regarding EP 12177056.4.

* cited by examiner

BROADCAST CONTROL

CROSS-REFERENCE TO RELATED APPLICATIONS

This application is a continuation of application Ser. No. 10/551,806 entitled "Broadcast Control" and filed on Feb. 8, 2007, which is a U.S. National Stage Filing under 35 U.S.C. § 371 from International Patent Application No. PCT/AU2004/000441 entitled "Broadcast Control" and filed on Apr. 2, 2004, which claims priority to Australian Application No. 2003901532 entitled "Broadcast Control" and filed on Apr. 4, 2003, each of which is expressly incorporated by reference herein in its entirety.

TECHNICAL FIELD

The invention relates to broadcast control. In particular it relates to a broadcast control apparatus for visual data, and a broadcast control apparatus for the recording and replay of visual data. The invention further relates to a system for broadcast control and a method for broadcast control.

BACKGROUND ART

Television production involves assembling source material such as the input from one or more cameras, video and audio into playlists or sequences being playlists with defined transitions, to create a program. How the sequences are assembled depends on whether the program is intended for live broadcast or whether it is pre-recorded for broadcast at a later period in time. Source material for live broadcast is typically captured from multiple cameras, assembled and then broadcast directly from a control room. Source material for pre-recorded broadcast may be retrieved from an archival facility, assembled into a program and then stored for broadcast at a later date. FIG. 1 illustrates an overview of the production and broadcast process.

In a production, the assembly of source material occurs in the control room which is configurable in three different ways; as a studio control room, an outside broadcast control room or a flyaway control room. Studio control rooms are typically a fixed facility within a building, controlling signals from cameras and microphones from a studio floor. Outside Broadcast control rooms are constructed in a vehicle such as a truck or van and generally deployed for sporting and entertainment events. The picture and sound signal from an outside broadcast van can be transmitted back to the TV station by microwave radio link, satellite or fiber optics. Flyaway control rooms, like outside broadcast control rooms, are portable, and generally used for outside broadcasts. Advantageously, flyaway control rooms are configured to break down into smaller components that can be packed into road cases, shipped to a location and reassembled for a specific event.

Typically, for an outside broadcast control room, the production crew is made up of at least twelve people, excluding camera operators. Table 1 lists each crew member and their associated responsibilities.

In the control room, the director co-ordinates and issues commands to the crew according to a storyboard. The director usually communicates with the crew via an intercom system. The director views on a first bank of television monitors the pictures coming from each camera. Typically a monitor is available for each source. Each camera operator works to pre-agreed guidelines and responds to the director during the production to ensure that the necessary picture is on the respective monitor as requested by the director. The director's assistant notes the timing and time code of each event captured by the cameras, which events from particular cameras the director may require later for editing, and advises the director on the overall timing of the production.

TABLE 1

| Role | # | Description |
| --- | --- | --- |
| Director | 1 | Controls all aspects of the production, directing how and when sources are combined and assembled into final program. No significant equipment operated. Primarily directs other operators. |
| Director's Assistant | 1 | Assists the Director in timing and logging of events and in providing graphic information. Often operates graphics generator. |
| Vision Switcher | 1 | Operates a vision switching panel and video effects unit under Director's commands. |
| Technical Manager | 1 | Technical responsibility for program content during production. Operates a range of technical monitoring equipment. |
| Broadcast Engineer | 1 | Responsible for setup and configuration of all equipment and troubleshooting/maintenance during production. |
| Camera Control Operators | 2 | Controls camera control unit CCU panels for each camera to ensure camera vision has correct exposure and colourimetry. |
| Audio Director | 1 | Operates an audio mixing panel to combine audio sources into completed program. Follows the video and Director's commands. |
| Videotape Operators | 4 | Record and replay video and audio sources using discrete magnetic storage devices. Generally videotape based with one video channel possible per machine. |
| Total | 12 | |

The vision switcher follows the director's commands and operates a large and complex vision switching panel positioned in front of the first bank of CRT monitors to mix and switch all the picture sources including live camera feeds, replays and graphics which make up a program. The vision switcher is also responsible for creating most of the digital video effects DVE's) which are produced electronically by an associated. DVE panel which may be built into the vision switcher. Typically, the vision switcher panel is rigidly built into the control room. The vision switching system is typically made up of a mixer frame and complex panel. Memory recall procedures on the panel are usually complex with poorly identified descriptors requiring the operator to remember significant detail about what is stored where, and requiring the operator to perform multiple keystrokes to recall programmed elements. Moreover, the vision switcher is usually required to integrate the individual video sources into a sequence, adding the transitions in a manual process under the supervision of the Director. Typically all switching has been performed using button presses on the panel.

The traditional configuration for the recording and replay of signals has been to use up to four videotape recorders (VTR's) and respective videotape operators to selectively record and then replay portions of the event. Not all cameras are recorded nor are they recording constantly. The videotape operators are seated behind a second bank of video monitors and are each responsible for recording a description of the action from a particular camera together with an appropriate time for the backed up tape. Traditional configurations use multiple video monitors for each operator, consuming space and generating significant heat loads. This also limits the flexibility with which the system can be located. Due to the area required for this activity, the video tape section is located away from the Director and communication is effected using talkback systems. This results in much additional activity merely to co-ordinate the two functions. An additional supervising operator typically monitors the activity of recording and replaying and assists the Director with editorial decisions on which source is to be replayed and in what order.

Videotape operators are further responsible for queuing the tape for replay whenever the director requires. To be able to do this, the videotape operators have to pull out their records, check the position on the tape where the particular event of interest happened, cue it ready for replay of the event and tell the vision switcher that they are ready. The videotape operator not only selects and plays the correct tape, but also gives regular time updates until the end of the video playback.

The graphics operator is responsible for queuing in graphics such as a scoreline, players' names, and any other text or graphic which needs to be generated on the spot. Having instructed the videotape operators to cue a particular replay, the director will then instruct the vision switcher to select the most appropriate camera angle. Understanding instructions from the director, the vision switcher will also add the appropriate graphics to each of the replays.

Just as the vision switcher mixes and switches picture sources, the audio director works from a mixing desk in the audio room, mixing sound signals from different sources and switching from one source to another. Also working in the control room are the camera control operators who have technical control over the cameras.

FIG. 2 illustrates a control room of a typical traditional outside broadcast van 20. The control room is segregated into various areas. In the video area 22, workstations are erected for the director, the director's assistant and the vision switcher. To one side of the video area 22 are multiple workstations for the videotape operators 24 to record and archive source material. To the other side of the video area is the area designated for production 26 and beside that the audio area 28. The workstations are built into desks primarily due to their size and the need to associate them directly with fixed, wall-mounted monitoring systems for the video and audio signals. As a result, certain operators are limited to certain areas.

Behind the video area is the engineering area 29. Traditional systems do not provide any centralised monitoring or system management. The engineer must address each device individually and generally has to wait for the results of a device failure to become evident rather than be prompted that a failure is imminent or has occurred. Setups must be re-set each time an event is undertaken. Depending on the device, individual operators may carry personalised operational disks with them to boot up the device with their preferences but generally no central management of this takes place.

The standard equipment used in television production equipment has not changed significantly in decades. Control rooms have remained static over time, and even though individual pieces of equipment have evolved, the pattern of staffing and the nature of the roles they perform have not changed.

In recent years, the television industry worldwide has commenced a transition to digital technology, in both production and transmission environments. Digital technology has brought with it additional features in some equipment, and has also supported the development of some new tools. However, the basic functions of the equipment have remained much the same.

Television has been, and is, subjected to increasing cost pressures for a number of reasons including the large size of the production crew, the increasing cost of basic production equipment, increased competition for viewers from a dramatic increase in the number of channels for distribution; changes in viewing patterns, and escalating costs for program rights—for sporting events in particular.

DISCLOSURE OF INVENTION

In a first aspect, the invention is a broadcast control apparatus for visual data, the apparatus comprising:

a touch screen display panel operable to receive and display visual data simultaneously in real time from a plurality of visual sources; and a touch screen graphical panel for the retrieval of control functions from a control function register;

whereby visual data from at least one of the visual sources is selectable for use by finger pressure on the associated portion of the touch screen display panel and the selected data is modifiable in accordance with a retrieved control function.

Control functions may include, but not be limited to: digital video effects and audio effects, triggering the reconfiguration of a router, reconfiguration of the touch screen display panel monitoring, and the command of an external device; for instance a graphics device. Control functions may include the control of non-on-air functions such as a background task for the transfer of visual data such as video between a server and a mixer associated with the apparatus, and the reconfiguration of video or audio sources within a router. Control functions may also be created using combinations of individual control functions.

The selected data may be modifiable in accordance with a retrieved control function, where that control function is effected by finger pressure on an associated portion of the touch screen display panel.

The broadcast control apparatus may further include a programmable panel having a plurality of programmable keys, each one of which is able to be programmed to retrieve a control function. The programmable panel may be positioned proximate the touch screen display panel, may be incorporated into the touch screen display panel or may be incorporated into a control panel. The control panel may include dials and further keys to enable switching between visual sources. The control panel may be a customised vision switching panel.

The selected data may be modifiable by finger pressure on a portion of the touch screen graphical panel that is associated with the control function. Alternatively, the selected data may be modifiable by use of a programmable key, or directly from the touch screen graphical panel.

A second touch screen display panel may be operable to receive and display further visual data or alternatively to view visual data for output. The touch screen display panels may be mounted on an electrically operated arm so as to move relative to the control panel.

Selected visual data may be cued to the touch screen graphical panel for transmission. Transmission may be broadcast live or may be stored for broadcast at a later date. Alternatively, the selected visual data may be previewed on the first touch screen display panel, on the second touch screen display panel, or on a screen independent of the broadcast control apparatus. Such a screen may be a plasma screen or may be one or more of a bank of monitors.

Digital video effects include, but are not limited to, snapshots, memories, timelines, transitions such as warps, fades, expansions, wipes, curls, overlays, notations, borders and chromaFX. Transitions between a first and second source may be effected by applying finger pressure on the associated portion of the touch screen display panel that represents a first source and dragging that source to a different portion of the touch screen display panel associated with a second source.

The control functions may be pre-programmed, named and stored for later recall. Optionally, the control functions may be programmed as they are needed. Programmable keys loaded with control functions may appear back-lit in green, indicating to the operator that the key is ready for operation. Keys which have yet to be loaded and which are therefore available for programming may appear, backlit red. Keys which are in use may appear backlit in a third colour.

The visual source may be input from video cameras, videotape recorders or disk servers, computer generated sources, remote feeds, or the like.

The broadcast control apparatus may further include a display module programmable to store a plurality of touch screen configurations. The configuration of all the visual data from respective visual sources on the touch screen display panel may be resized depending on the number and type of visual sources operating at any one time. A plurality of screen configurations may be programmed into one or more of the programmable keys. Advantageously, the Director is able to view all streams of visual data operating at any one time so as to select the visual data most applicable to the job requirements.

It is envisioned that the apparatus in accordance with the first aspect of the invention, will be operated by the Director.

The broadcast apparatus in accordance with the first aspect may be operational in two modes, a set up mode and an operation mode. In the set up mode the broadcast apparatus may include pre-programming control functions. In the operation mode, selection of sources and transition between sources are performed.

In a second aspect, the invention is a broadcast control apparatus for the recording and replay of visual data, the apparatus comprising:

a touch screen display panel operable to simultaneously playback more than one stream of visual data from a storage unit, the visual data sourced from a plurality of visual sources;

a touch screen graphical panel for the retrieval of control functions from a control function register; and a control panel in communication with the touch screen panels and video servers, the control panel including a plurality of programmable keys, each one of which is able to be programmed to retrieve a control function;

whereby playback of visual data from the storage unit is able to be modified in accordance with a retrieved control function.

Control functions may include, but not be limited to: digital video effects and audio effects, triggering the reconfiguration of a router, reconfiguration of the touch screen display panel monitoring, and the command of an external device; for instance a graphics device. Control functions may include the control of non-on-air functions such as a background task for the transfer of visual data such as video between a server and a mixer associated with the apparatus, and the reconfiguration of video or audio sources within a router. Control functions may also be created using combinations of individual control functions.

It is envisioned that the apparatus in accordance with the second aspect of the invention, will be operated by a replay and effects director. Visual data may be modified with a control function by use of a programmed key from the control panel or a portion of the touch screen graphical panel that is associated with the control function.

The broadcast control apparatus in accordance with the second aspect of the invention may comprise a second touch screen display panel for output video monitoring. The storage unit may be a record and playback device or any device that stores and plays back via electronic, optical magnetic, or other live media or storage media. For example the storage unit may be a server system which comprises a plurality of RAID disk drives.

The control panel may further comprise one or more of a speed control section for at least controlling the rate of play of a visual source or transition, a timecode section for displaying the length of a visual source, a cueing section for marking and searching of cues and for the navigation within the storage device and a slow-motion section.

The touch screen graphical panel may be used to build playlists and sequences and may be used to define video clips. The touch screen graphical panel may also be used to configure the control of video servers, to configure the touch screen display layouts, to program the programmable keys, to control input signal routing and to control audio monitoring.

Advantageously, the use of the touch screens m conjunction with the pre-programmed effects keys enables monitoring in the near-field and provides an alternative to large banks of fixed monitors, thereby minimising space.

The touch screen display panels may be positioned on a motorised arm to enable the panels to be brought in front of, or to the rear of the control panel, and therefore closer to, or away from, the operator.

The invention further includes a system for broadcast control comprising:

a first apparatus comprising a touch screen display panel operable to receive and display visual data simultaneously in real-time from the plurality of visual sources; and a touch screen graphical panel for the retrieval of control functions from a control function register; whereby visual data from at least one of the visual-sources is selectable for use by finger pressure on the associated portion of the touch screen display panel and the selected data is modifiable in accordance with a retrieved control function;

a storage unit for storing visual data from a plurality of visual sources;

a second apparatus comprising a touch screen display panel operable to simultaneously playback more than one stream of visual data from the storage unit and to produce an output; a touch screen graphical panel for the retrieval of control functions from a control function register; and a control panel in communication with the touch screen panels, the control panel including a plurality of programmable keys, each one of which is able to be programmed with a retrieved control function; whereby playback of visual data from the storage unit is able to be modified in accordance with a retrieved control function;

whereby the first apparatus is operable to edit selected modified data with output from the second apparatus for transmission.

The second apparatus may further be modifiable to edit its output with modified data from the first apparatus so as to create a sequence for transmission. The sequence may then be made available to the operator of the first apparatus.

The first apparatus of the system may further include a programmable panel in communication with the touch screen panels, the programmable panel having a plurality of programmable keys, each one of which is able to be programmed to retrieve a control function. The programmable panel may be positioned proximate the touch screen display panel, may be incorporated into the touch screen display panel or may be incorporated into a control panel. The control panel may include dials and further keys to enable switching between visual sources. The control panel may be a customised vision switching panel.

The output from the second apparatus may be modified or unmodified visual data. The touch screen graphical panel of the second apparatus may have control over one or more of the plurality of programmable keys on the control panel of the second apparatus for the execution of video effects or for defining video clips and playlists. This may enable the second apparatus to edit modified visual data with output from the first apparatus.

The selected data may be modifiable by finger pressure on a portion of the touch screen graphical panel that is associated with the control function. Alternatively, the selected data may be modifiable by use of a programmable key, or directly from the touch screen graphical panel.

The system may further include central control unit panels which may be provided for each camera to ensure that camera's vision has correct exposure and colourimetry. The system may further include an audio mixing panel to combine audio sources into completed program.

Advantageously, the system is operable to control third party devices for example a graphics generator.

The invention further includes a method for broadcast control comprising the steps of:

storing control functions in a control function register;

displaying on a touch screen display panel of a first apparatus visual data simultaneously in real-time from a plurality of visual sources; a first operator selecting visual data from at least one of the visual sources by finger pressure on the associated portion of the touch screen display panel of the first apparatus; the first operator retrieving a control function from the control function register; and the first operator modifying the selected visual data with the retrieved control function to produce a first output and cueing the first output for transmission.

The method may further comprise a second set of steps including:

storing visual data from at least a portion of the plurality of visual sources; a first operator replaying streams of stored visual data simultaneously on a touch screen display panel of a second apparatus; a second operator selecting a stream of visual data by finger pressure on the associated portion of the touch screen display panel of the second apparatus; the second operator retrieving a control function from a control function register; the second operator modifying the selected visual data with the control function to produce a second output; and the second operator cueing the second output relative to the first output to create a sequence for transmission.

The second set of steps may be applied whenever the first operator is wanting to insert historic video footage into live footage. The first operator instructs the second operator to create a sequence and the second operator may in response, source a particular piece of footage and modify it with a particular transition. All the visual data from the sources may be stored. The step of the first operator retrieving a control function may comprise the operator activating a touch screen graphical panel or activating a key programmed with the control function. The second operator, or a third operator may be responsible for pre-programming the key with the control function. Alternatively the first operator may program the key during operation.

The method may include the step of configuring or re-configuring the touch screen display panel of a first apparatus to display the plurality of visual sources.

The first operator may effect a transition such as a wipe by finger pressure on the associated portion of the touch screen display panel representative of one source dragging that source to another portion of the touch screen display panel representative of another source.

The first operator and second operator may access the same control function register or may access different control function registers.

The created sequences may be transmitted live or may be stored for broadcast at a later date.

A further advantage of at least one example of the present invention is that the number of operators required is reduced and the workflow is changed significantly. Changes are supported by reducing the size and complexity of the equipment, while maintaining the level of equipment functionality and therefore the quality level of the production. Staff savings may advantageously flow on to significant savings in travel, accommodation and meals. Simplification of the equipment is also likely to enable the sourcing of essential staff from local markets, rather than having to travel to remote locations from the home base.

Further savings are advantageously achieved from the reduction in overall equipment size. The equipment can be deployed in a smaller physical space, requires less power, generates less heat, and requires less air-conditioning in an example such as an outside broadcast situation, travelling becomes more flexible and can potentially be accomplished using existing crew to drive, rather than engaging specialist drivers.

BRIEF DESCRIPTION OF DRAWINGS

As known in the art.

Figure 3A:
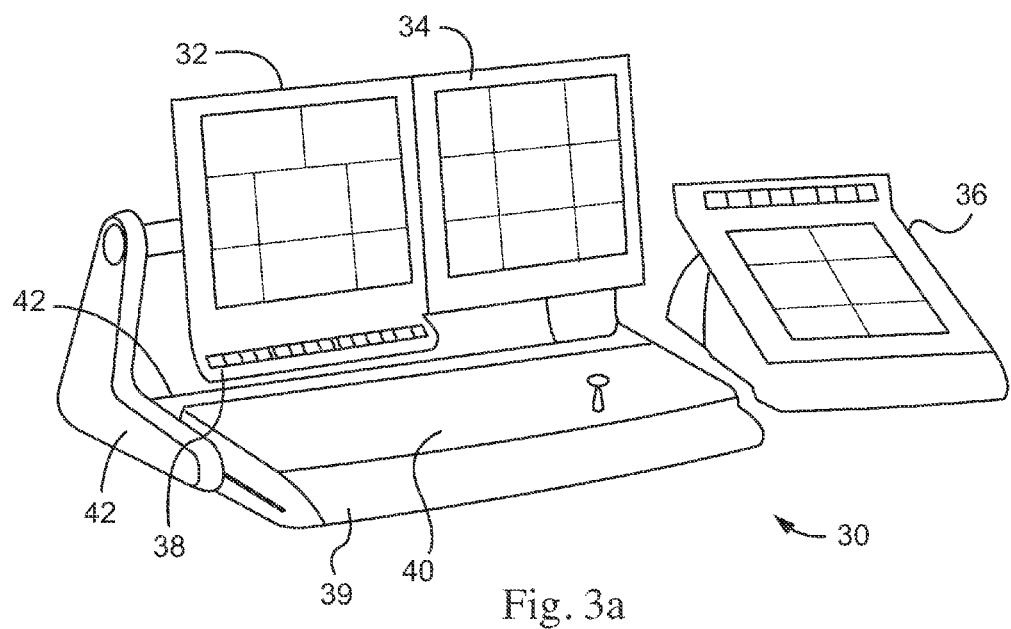
Figure 3B:
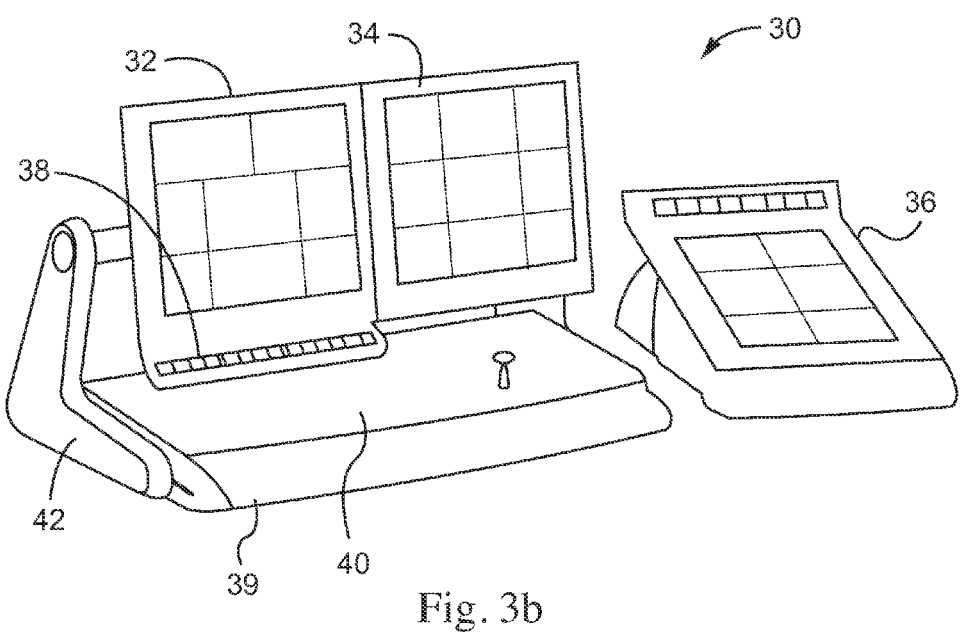
Figure 4:
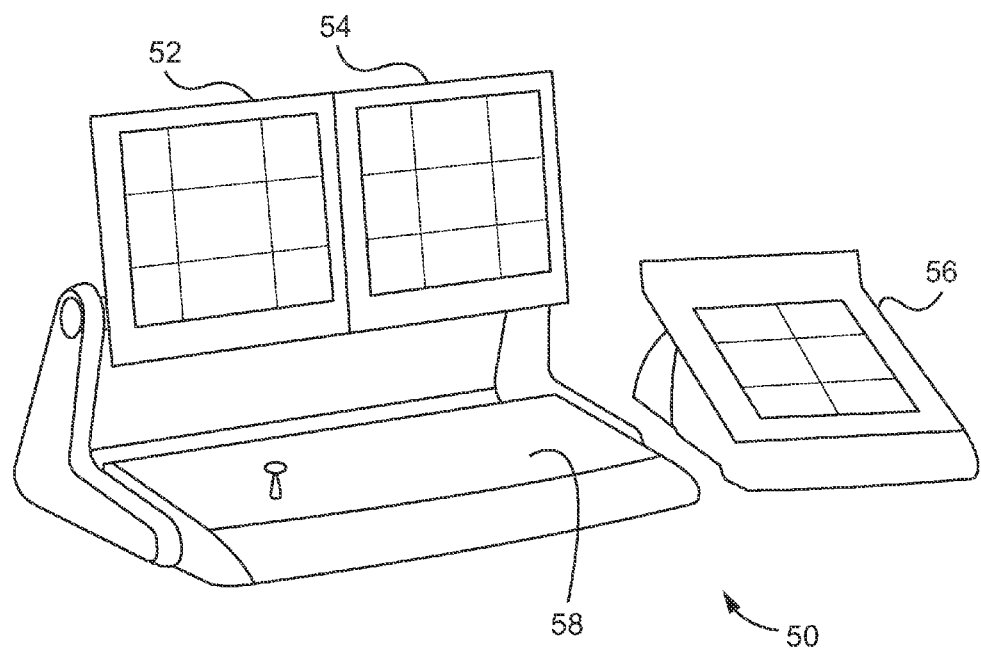
Figure 5:
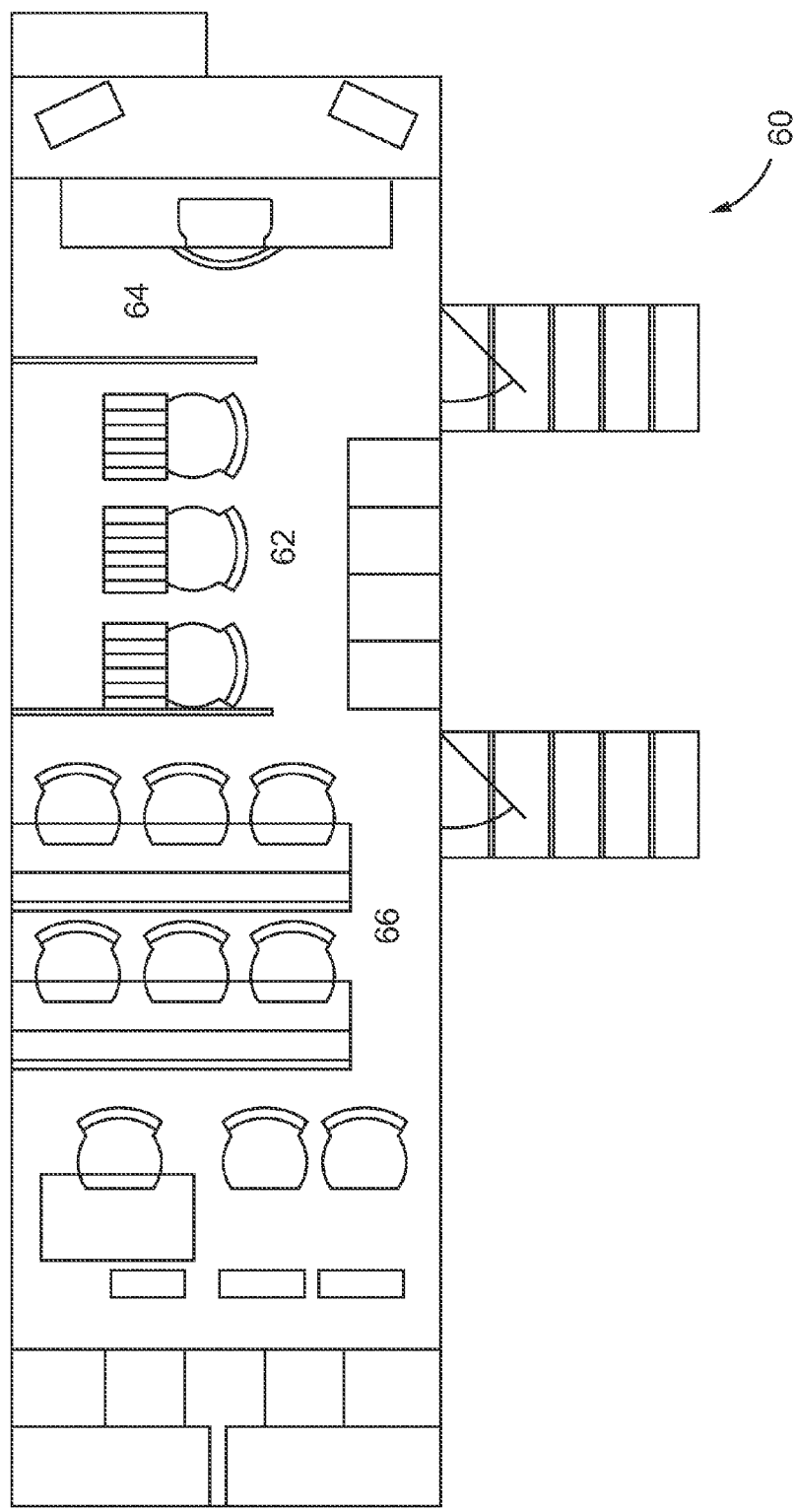
Figure 6:
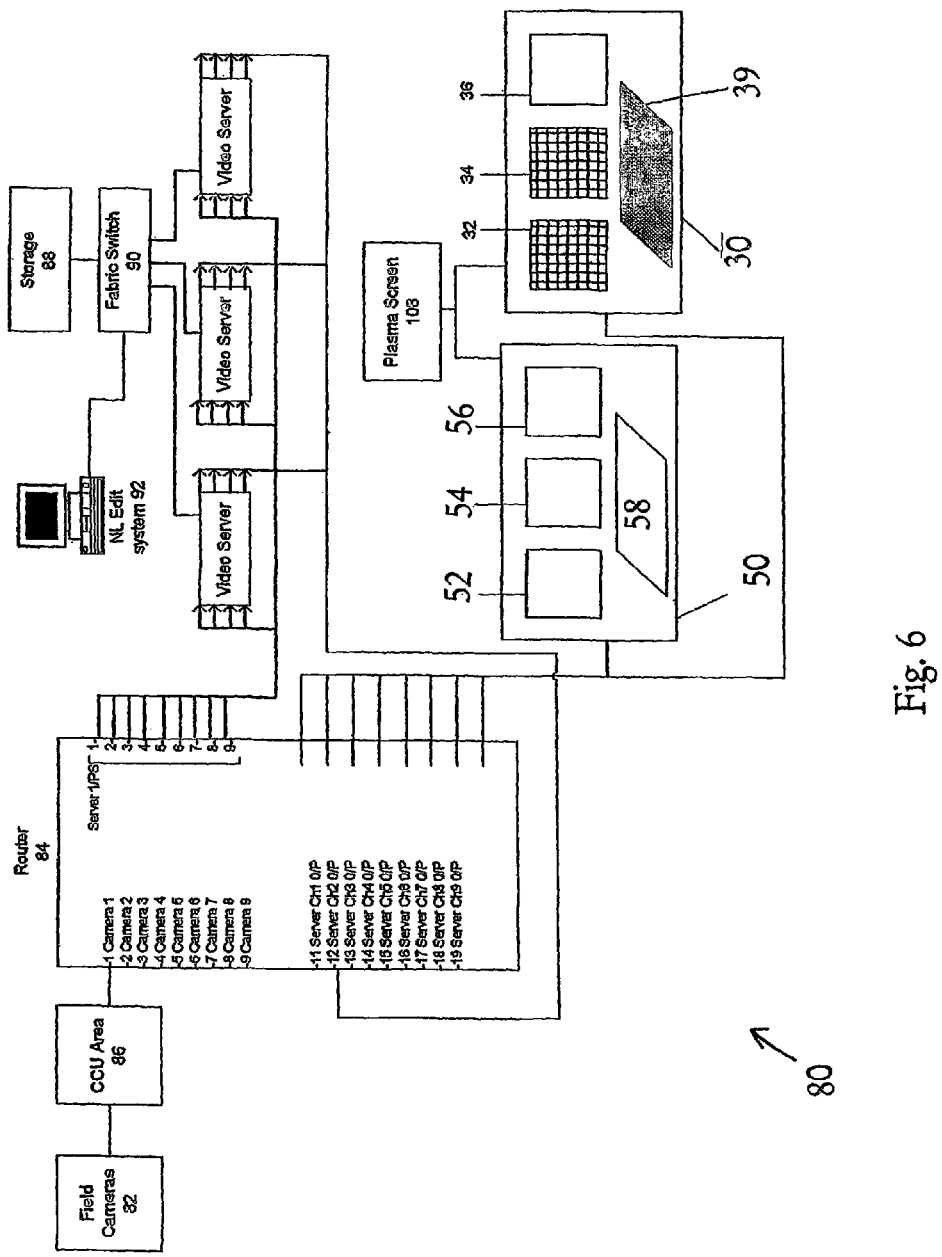
Figure 7:
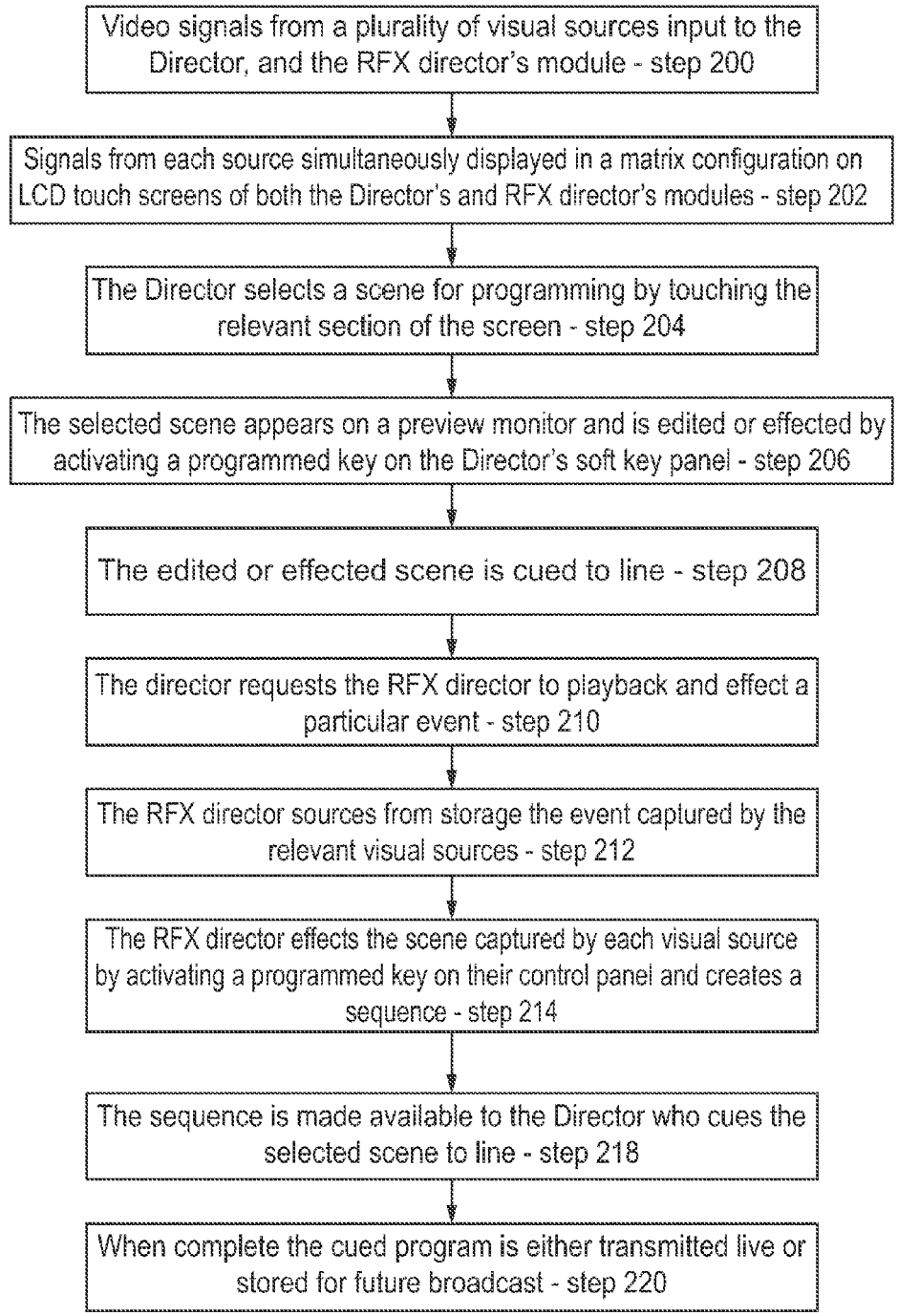

An example of the invention will now be described with reference to the accompanying drawings; in which:

FIG. 3a is a perspective view of the Director's control panel and touch screens in an extended position;

FIG. 3b is a perspective view of the Director's control panel and touch screens in a reduced position;

FIG. 4 is a perspective view of the RFX director's control panel and touch screens;

FIG. 5 is a schematic diagram of an outside broadcast utilising the principles of the present invention;

FIG. 6 is simplified block diagram of the operation of the broadcast control process; and FIG. 7 is a flow diagram illustrating the operations of the Director and the RFX director.

BEST MODE FOR CARRYING OUT THE INVENTION

In accordance with the invention, a radically different approach to vision mixing has been adopted. First, the task of switching picture sources is performed by the Director rather than a vision switcher whose role is rendered obsolete. In order to support this, the user interface of the former vision mixer is significantly reduced in its complexity of operation and in its size. Furthermore, operation of the new vision mixer is partially based on the triggering of pre-programmed events or timelines.

Second, a new role, that of the replay and effects (RFX director, renders the role of the videotape operators obsolete. The RFX director is aided by a module which includes a control panel and one or more user interfaces. The Director, his or her assistant, and the RFX director all work in close proximity to one another.

FIGS. 3a and 3b illustrate the Director's module 30 in extended and reduced configurations respectively. The module has three LCD touch screens 32, 34 and 36, the latter being a Graphical User Interface GUI. A soft key (programmable key) panel 38 is provided below touch screen 32. The module also includes a control panel 39 having rows of panel keys 40, and mixer frame (not shown).

Touch Screens

LCD touch screens 32 and 34 are mounted on electrically operated arms 42 and display input source video and output video respectively. Screens 32 and 34 are functionally and physically the same. Screens 32 and 34 enable a matrix display of up to sixteen video signals per screen which primarily display the digital output from cameras, although the output can be displayed from video tape recorders, DVDs, replay and playback devices, or any device that stores, records, generates or plays back via electronic, optical, magnetic, or other storage media. The size and positioning on the matrix of each video source is varied contextually according to the sources being manipulated at the time. Furthermore, the size and positioning on the matrix of each video source is able to be reconfigured by the Director at any time. Each area of the matrix is configured with a symbol or word descriptor of the associated signal source for easy identification. The Director is able to personalise the name of each video source at his or her convenience. Personalisation of the sources is performed via the GUI 36. Reconfiguration of the matrix is performed with a single push button operation as discussed below.

In this example, screen 36 is mounted on an incline and is used as a touch screen GUI for operational commands, and the GUI displays a number of software control screens to support these operational commands. One of these screens is a sidepanel application which is required for setup and control of the vision mixer. An example of this mixer control is the recall of a timeline.

The other software control screens on the GUI allow the operator to perform various functions including the creation or modification of layouts and software control buttons for the touch screen display 32, control of the vision mixer auxiliary buses, control of audio source monitoring, the and the creation of control functions that may effect control over any device or combination of devices within the system. These control functions are then stored in a register within the software system. Using the GUI, the operator can assign these control functions to one or more of the programmable keys 38 located beneath the touch screen 32 or directly to a specific area of the touch screen 32. This may occur during pre-production or production. Such configured keys 38 appear back-lit in green, indicating full readiness. If a control function is assigned to the touch screen 32, a status indicator is used to differentiate that area these effects and tasks can then be recalled and executed by a director who is not experienced with conventional vision mixer operations. Other effects may be selected during production and the available keys 38 appear backlit red. The use of the screens in conjunction with the pre-programmed effects keys also provides an alternative to large banks of fixed monitors, thereby minimising space.

An audio switching panel located in the lower portion of the touch screen GUI 36 provides touch screen access so that during operation, the Director and RFX director can hear different audio sources.

Soft Keys

The soft keys 38 comprise a set of thirteen programmable backlit alpha-numeric LCD pushbuttons. The soft keys 38 are linked via software to a range of devices in the system including the vision mixer, servers, router and are programmable to enable a range of functions involving some or any of the devices. Whilst not limited to the function described, in the Director's module they are primarily used to execute pre-programmed functions such as snapshots, memories and timelines within the mixer or to execute multiple functions which are pre-programmed. For instance activation of a soft key may execute reconfiguration of the Director's screen layout. Successive activation of the particular soft key may execute successive screen configurations. The soft keys 38 can also be programmed to include control over other devices, such as the video servers or audio mixer, to execute more complex effects than those normally available within a vision mixer engine. They can also be used to control the display module (referred to below) to effect changes to the display configuration on any of the LCD touch screens. More particularly, the display is used to show the Director or RFX director a descriptor of the specific function stored within the key at that time, and to show the status of that function. A button text is used for the descriptor and backlighting the key is used to show the status. The combinations of each are used contextually to give the Director or RFX director a clear indication of function status.

The keys 38 are assignable in banks. The banks are switched using a menu key at the right hand end of the panel 39, which when pressed brings up a series of menu keys on the keys 38. This enables processes such as the assignment of functions to the individual keys or banks of keys, selection of other banks of functions (stored in groups of twelve), or setup functions for the menu itself. These functions are typically performed in conjunction with the operator's GUI screen 36.

Mixer

The vision mixer frame is a commercially available frame such as one developed by Thomson. The mixer frame comprises a series of PC boards within a rack mount frame and a series of inputs and output connections to those boards for serial digital video signals. It effectively performs the transitions between signals and adds video effects as instructed by the Director. The mixer frame is able to be programmed in advance, enabling the operator to store and recall snapshots, memories and timelines. Snapshots are mixer configurations that position specific functions and statuses according to operator preferences. Memories are stored effects that can be recalled and triggered when required, and timelines are a series of events that can be recalled and triggered event by event when required.

Display Module

The display module comprises multiple printed circuit boards in rack mounted frame, with multiple video inputs and outputs on the rear panel. The display module is designed to accept serial digital video input signals, to re-size and shift the image, and to enable the display of multiple images concurrently on the LCD screens. Programming enables up to sixty four different screen configurations to be stored. Recall and display of different configuration is instantaneous and does not require redraw time. This is in contrast to most similar devices which are not designed to change rapidly between display configurations and are therefore not suited to this production application.

The display is configured in two layers, with the background layer underneath the video layer. The background layer comprises the base graphic layer, frames around the video and any identification text, whilst the video layer comprises the individually sized and positioned video windows.

Engineering Module

The engineering module comprises a standard PC interface running a combination of software. This module performs two primary functions: system monitoring and diagnostics and centralised management.

The system monitoring and diagnostics is umbrella software that brings together a range of other software and communications links from discrete third party devices. The majority of these devices has a diagnostic connection that enables the status of the device to be viewed and/or controlled remotely, generally using a web browser. When an alert is displayed, the engineer can enter the device-specific application, to correct the fault and adjust the device if necessary.

The centralised management system is software that brings together the setup and configuration of each discrete device within the system. Each device typically has a hierarchy of parameters that are configured on a more or less frequent basis depending on their nature. Typically this hierarchy might be represented thus:

Initiation & Installation—upon first initiating the device and installing into a system System Setup—to enable operation within a system of other devices, for example to integrate into a network Event Setup—parameters tailored to a specific location or event, for example configuration of the router for the number of cameras Program Setup—parameters tailored to a specific program, for example video effects tailored for a specific look Operator Setup—specific preferences of individual operators; to, for example placement of macro keys or speed behavior of the spin knob on the RFX module's control panel.

The centralised management system integrates this matrix of parameters into specific files that can be used to facilitate easy and fast setup of the system prior to events, and the capture of adjustments to the setup during events. This enable setups to be re-used at similar events in the future.

Operation

The Directors Module is operated in two different modes—setup and operation. Setup is intended to be performed by an experienced Vision Switcher and allows digital video effects DVEs, to be programmed, named and stored for later recall. DVE's include, but are not limited to, mixer snapshots, memories, timelines, warps, fades, expansions, wipes, curls, overlays, notations, borders and chromaFX. Programming of the DVE's is achieved using the soft keys 38 and the GUI 36.

Operation of the Director's module is intended to be performed by the Director and has two sub-modes: the 'Touch Switching' mode and 'Panel' mode.

In Touch Switching mode, screens 32 and 34 are brought forward using the electrically operated arms 42, positioning them closer to the Director and over the top of the control panel 39 (FIG. 3 b) The selection of sources and transitions between sources is done by touching the required vision on the touch screen 32, or by touching specific menu buttons on the display screens 32, 34. Touch Switching mode also uses the soft keys 38 to perform other aspects of the transitions and complex effects. These keys are labelled with user-defined descriptive names and enable the completion of complex effects without the need for the Director to have the skills to manipulate a traditional vision switching panel. Direct cuts between sources can be effected by touching the relevant source. Other programmed transitions such as wipes or dissolves can be effected by touching and dragging the existing source on one section of the matrix to another source on another section of the matrix. For all but the most complex productions the traditional vision switching panel is avoided as all functionality is controllable through the touch screens 32, 34 and the soft keys 38.

In Panel mode, screens 32 and 34 are sent back using the electrically operated arms 42, exposing the control panel 30 in full and positioning the screens 32, 34 at a longer reach position but still able to be touched for switching purposes (FIG. 3 a). The design of the panel 30 follows a number of the traditional patterns set by existing and past switching products but also has a number of different features that enable the use of fewer rows of keys and fewer modules of control keys in areas such as the keyers and memories. In both Panel mode and Touch Switching mode, both the panel keys 40 and the touch screen switching are enabled, along with the soft keys 38. All three components can be used in the balance desired by the Director to switch the program.

Should a Director be faced with a complex program that is beyond their switching skills, then an experienced Vision Switcher can be used to operate the panel 30 and the Director can assume their traditional position beside the Vision Switcher.

RFX Module

As illustrated in FIG. 4, the RFX module 50 comprises three touch driven LCD screens 52, 54, 56, one control panel 58, and a RS422 router and scalable video server system (not shown). The RFX module 50 enables a single RFX director to perform the function formerly performed by four videotape operators. The RFX director's control panel 58 further includes pushbuttons, speed control and keyboard.

Touch Screens

The first and second touch screens 52, 54 are mounted on a fixed arm and display source video, i.e they are used for monitoring of input and output video signals. Touch screens 52, 54 are physically and functionally the same. This third screen 56 is mounted on an incline to the RFX director's right hand side. The third screen 56 is a touch screen GUI and is primarily used for clip management which includes viewing menu commands and lists of video files available for manipulation. Like the Director's module, the LCD screens of the RFX Director's module enables near field monitoring with access to inputs and outputs.

The GUI 56 and soft keys also controls one of the effects rows on the Director's control panel 30, making the full range of video effects from the Director's module available directly to the RFX director for inclusion in packaged replays, which are delivered back to the Director. In contrast to the traditional situation where replay operators supply raw video to the Vision switcher for manipulation and packaging, the RFX director is advantageously able to supply fully packaged replays that allow the workload to be distributed flexibly between the Director and RFX director as required by the production.

Control Panel

The RFX modules control panel 58 has a number of components and functional areas that enable the control and manipulation of up to twelve channels of video server output.

i. Soft keys are a programmable resource and can perform a range of functions. They are intended to allow custom functions to be assigned according to the specific application of the user. The soft keys are programmable in a number of different ways, including server transport control, control of video and audio effects, control over other system devices, and for a range of RFX-specific tasks. These include text tagging of clips, where a descriptor is applied to a clip to describe the event being captured at the time. Examples of this include a team or player name, a sports event such as a 'try' or 'goal', a specific quote or action from a performer, or a point in a song. For example, by pressing labels marked "goal" and "Sydney" a tag is created to the particular portion of video. The soft keys are also used to reconfigure screen layouts. The use of soft keys simplifies and speeds the process significantly. One or more keys may be programmed with the ability to rewind all of the source which are in a record mode simultaneously.

ii. A Speed Control section provides a standard spin knob that has jog, variable speed and shuttle functions available by selecting the appropriate key. Each of these functions has user-definable speed parameters. The spin knob is generally used to control the server channels selected on the Output Screen but can also be assigned, using a "Line" key to control the on-line channels to allow variable speed control in forward and reverse modes as well as a jog mode for frame-by-frame analysis.

iii. A Timecode section displays the current clip timecode on an LED readout and allows the entry of specific timecodes to support clip searching and the trimming of existing clips.

iv. A Transport section provides standard control over the server transports.

v. A Cueing section provides keys for the marking and searching of cues and the rapid navigation within files on the server.

vi. A Slomo section provides a T-Bar style control for the control of speeds between −200% and +200%. This is typically used within the 0-100% range although other speeds are assignable temporarily using a combination of keystrokes or as presets using the setup menus on the GUI 53.

Server System

The server system is a commercially available frame such as one developed by Thomson. It comprises a number of RAID disk drives, together with the appropriate codecs and controllers to enable the ingest and encoding, decoding and output of serial digital video and AES audio signals. The video signals are recorded with embedded audio as compressed MPEG2 data files. As the system is designed to record all camera sources, it removes the need for video operators to control record modes and to switch inputs for selective recording. Provisions are made such that a Master Record can be made to a video server channel or to an external recording device. In addition, an archive recording can be made, in the format required by the producer, either progressively during the event, or as a single task at the conclusion of the event. If the record format is compatible with high speed data transfer protocols (such as SDTI) these archive recordings can be completed at rates faster than real time, thus minimising time required for post-event archiving.

The server system is controlled via two separate paths—the first being an internet protocol network connection and the second via the RS422 router. The RS422 ports carry panel to server communication and the network connection carries communication using IP-based protocols.

Operation and Relationship to the Directors Module

The RFX director is primarily responsible for the introduction of replay material and to set up record and playback with loaded effects via the RFX module 50. The RFX director works closely with the director, sitting alongside the director to enable all the positive benefits of in-person communication. Positioning the director and RFX director alongside each other enables a close working understanding to develop, where each knows clearly what the other has in progress and planned.

The RFX module 50 provides the RFX director with control over the inputs to and outputs from the server system. Control can be effected over individual server channels or groups of channels and this control can be selected as required, typically being changed constantly through a production. Pre-defined sets for control can be defined and allocated to on-screen buttons or to soft keys to assist rapid channel group selection.

Typically the RFX director's module 50 is placed in record at the commencement of the production and all camera outputs are recorded for the duration of the event. As described, touch screens 52, 54 are physically and functionally the same, however in this example, the first touch screen 52 displays a matrix display of the inputs from each of the visual signal sources, which are generally cameras. The picture seen by each camera will be displayed on this first screen whilst the RFX director is using the second touch screen 54 for replays and inserts, as well as for viewing the outputs of each of the video server channels. The selection of the channels to be controlled at any point in time is accomplished by touching the image on the touch screen. Programmed sets of these controlled groups can be defined and made available on single touch buttons.

The RFX director has the ability to lay cues on the record side of the server and to review these cues, developing them into clips, or playlists of clips or sequences. The RFX director can add descriptive tags to cues or clips using the soft keys on the control panel 58 and can navigate quickly between banks of these soft key tags to provide a wide range of descriptors.

The RFX director's GUI screen 56 is used to define clips and build playlists and sequences. A playlist may be constructed in response from the Director's instructions during the broadcast period, or alternatively may arise from pre-scheduled instructions. Using the control panel 58 to locate and control specific clips, the RFX director builds finished events and places them in an output buffer, from where the Director can put the event to line. Effectively, the output of the REX module 50 is passed to the Director's module 30 and is thus made available to the Director. When ready, the Director can select a single panel key 38 or touch an image on the touch screen 34 to implement an effect row on that panel. The mixer associated with panel 39 then receives instructions to implement the playlist. Once on line, both the Director and the RFX director have control over the event, and can control when it steps through to the next part of the playlist or sequence, automatically triggering the transitions as defined. Furthermore, the Director can at any time override the operation of the playlist with a single key stroke which limits on air control to the Director's domain.

Communication with the Director, previously performed using a talkback system, is now achieved face to face. The small size of the modules allows co-location of the Director and RFX director, eliminating the need for talkback between these two key operators. Furthermore, if the Director does not want the RFX director to utilise a particular digital video effect, the Director is able to de-program that effect.

For both the Director's and RFX director's screens, screen splitting devices SSD's are employed to display multiple signals simultaneously and to enable instant switching between screen layouts. Furthermore, the SSD's enable, the screens on which the images are displayed to be deployed as touch screens by tracking the position of the image and source and linking the operator's finger touch back to the source to support switching commands.

Furthermore, the SSD's drive the liquid crystal displays for close-range monitoring such that the relative image size and resolution are maintained at least at the levels in traditional monitor wall configurations. The operator can switch between various pre-programmed screen configurations to display the required sources according to the program component being worked on. All sources are available to the operator through the use of router outputs to feed the screen splitting device. Advantageously, massive reductions in weight, heat generation and power requirements result from the use of LCD's as compared to cathode ray tube monitor walls.

The staffing for an outside broadcast control room utilising the principles of the invention is illustrated in Table 2. Compared with the staffing of a prior art broadcast control room as shown in Table 1, the total number of operators is reduced and the roles which staff engage in are modified.

TABLE 2

| Role | # | Description |
| --- | --- | --- |
| Director | 1 | Controls all aspects of the production, directing how and when sources are combined and assembled into final program. Operates simplified vision switching panel and automation controls. |
| Replay & Effects Director (RFX) | 1 | Controls all recording and replays using video server system and automated Replays. Linked closely with the Director role. Second RFX operator required for very complex productions. |
| Director's Assistant | 1 | Assists the Director in timing and logging of events and in providing graphic information. Usually operates graphics generator. |
| Vision Switcher | 0 | Not required except for very complex productions. |
| Technical Manager | 1 | Technical responsibility for program content during production. Operates a range of technical monitoring equipment. |
| Broadcast Engineer | 1 | Responsible for setup and configuration of all equipment and troubleshooting/maintenance during production. |
| Camera Control Operators | 2 | Controls CCU panels for each camera to ensure camera vision has correct exposure and colourimetry. |
| Audio Director | 1 | Operates complex audio mixing panel to combine audio sources into completed program. Follows the video and Director's commands. Scope and complexity of equipment reduced significantly to reduce cost and size. |
| Videotape Operators | 4 | Not required. |
| Total | 8 | |

Figure 1:
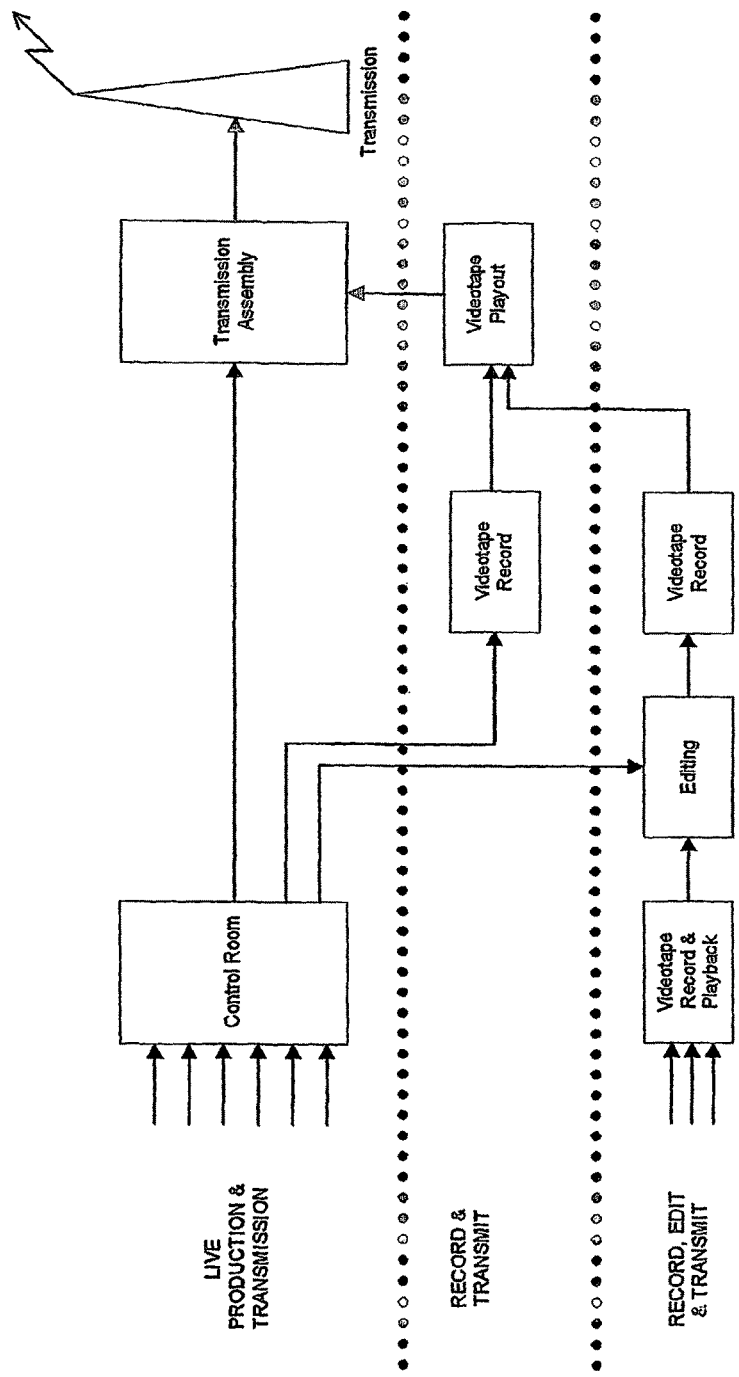
FIG. 1 is a schematic diagram of production and transmission methods.
Figure 2:
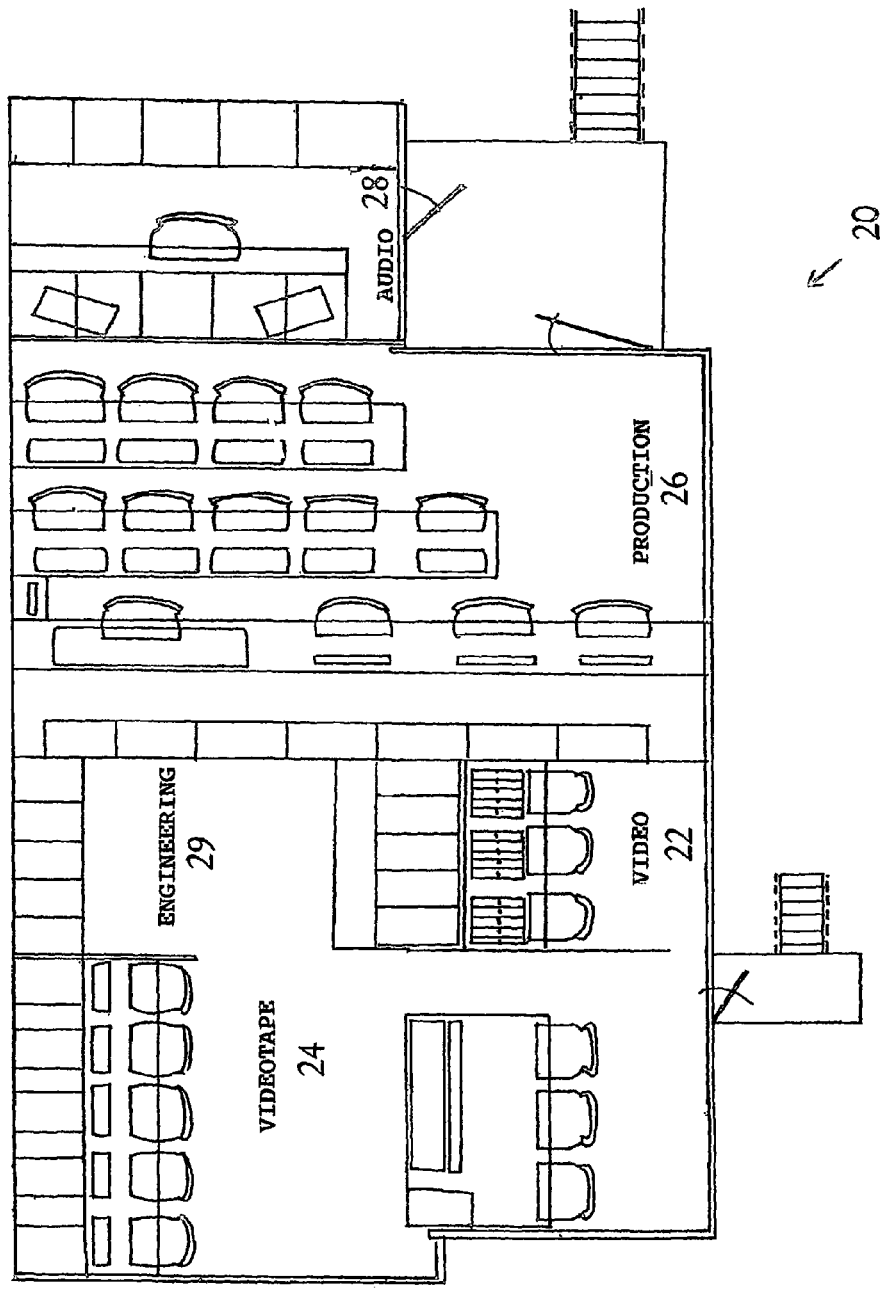
FIG. 2 is a schematic diagram of an outside broadcast van.

FIG. 5 illustrates a control room 60 of an outside broadcast van that embodies principles of the present invention. In contrast to FIG. 2, the video area 62 workstations are erected for the director, his or her assistant and the newly created role of the replay and effects, RFX director. Videotape operators and associated workstations as illustrated in FIG. 2 are now obsolete. To one side of the video area 62 is the audio area 64 and to the other side, the CCU/engineering area 66 which is designated for production and transmission. The role of the Audio Director may be designed to follow a more automated approach, focusing more heavily on intervention rather than constant active adjustment.

FIG. 6 illustrates a simplified schematic diagram 80 of the broadcast control system embodying the invention. In addition to FIG. 5, the functionality and operation of the Director's module and the RFX's module is indicated in FIG. 7.

A number of field cameras 82 are deployed, each of which view a scene from different angles to be directly televised or recorded. In a football match for instance, a camera may be mounted on a dolly to track the movement of a player running down the field. Other cameras may be stationed along the length of the field so as to capture close-ups of players during events such as tackles and tries.

Each of the cameras 82 generate video signals which are input into a routing device 84 via camera control units 86 which ensures that the output from each camera has correct exposure and colourimetry. Server inputs and outputs are managed by router 84 so as to appear in fixed positions for the purposes of vision switching. As illustrated, signals from camera two are recorded onto server channel two in centralised storage area 88 and replayed on server channel twelve. All routed video signals are recorded to disk in the centralised storage area 88. The signals are passed through a fabric switch 90 which communicates with a non linear edit system 92.

The Director's module 30 includes a plurality of input terminals. Depending on the number of field cameras employed, one or more of the Director's LCD touch screens 32, 34 receives video signals, from the router, step 200. The LCD screens are configured in a matrix arrangement such that signals from each camera are displayed in respective areas of the matrix of the LCD screens, step 202. In this way, the Director is able to continuously view the input from each camera and select which of the scenes are to be used for program output.

The Director is able to select video scenes on the near-field monitoring by touching the respective area of the matrix, step 204. Pre-programmed effect keys on the Director's control panel 39, are used to modify any of the chosen scenes, step 206. The GUI 36 further enables production of a program output which carries the video signals to be presented for broadcast. The program output is adapted for connection to a television broadcasting apparatus in the case of live-to-air television program or to television recording apparatus in the case of a prerecorded program.

The RFX director's module 50 is in two-way communication with the Director's control panel 39 and with the video servers. The first touch screen 52, of the RFX interface screens 52, 54 and 56 is similar in configuration to that of the Director's screen 32 and displays a matrix of the inputs from each of the visual signal sources. The second LCD touch screen 54 is used for replays and inserts. To assist with this functionality, the RFX directors control 58 panel has key controls which include pushbuttons, a fader and keyboard.

Upon directions from the Director, step 210, the RFX director replays a particular event captured by a number of cameras, step 212. The RFX director is able to modify replays by activating a pre-programmed key on the RFX director's control panel, step 214. The sequence is made available to the Director, who can then cue the selected scene to air, step 218. This process is repeated until the program is complete. The completed program is then transmitted live or stored for future broadcast, step 220.

Whilst this example has been discussed in relation to an outside broadcast control room, it should be appreciate that such an example is only one of the many utilising the principles of the invention. The invention can also be applied to studio control rooms or flyaway controls rooms. Whilst it is anticipated that the majority of productions can be supported using a single RFX director, more complex events may require up to three RFX directors, each operating a module using a common RS422 router and server system with their own panel, and screens. Arbitration over the control of channels is achieved using a concept where channels are assigned to a specific RFX director, and to be re-assigned must first be released by that operator to a free zone. Other detailed operations and layouts of controls may be designed to support the control of multiple channels. This is supported by the menus available on the RFX modules GUI screen.

Further development of the RFX module involves the integration of devices such as sports scoring systems. These systems generate large volumes of descriptive data that can be used to describe the events being recorded. The system will capture this metadata and record it, capturing the timecode association with the footage. Scoring data can also be captured, allowing score graphics to be regenerated in post-production. Currently, this data is stored separately in a PC and is not associated with the footage of the event.

Although one embodiment has been discussed, it should be appreciated that such an embodiment is only one of the many utilising the principles of the invention. In an alternative the system may be operable to control other devices, for instance an audio device, graphics generator or the router, via the programmable keys and/or screen operations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A broadcast control apparatus comprising:
   a touch screen display panel operable to receive and display live visual streams of video data from a plurality of visual sources, where the touch screen display panel is configurable to display said live visual streams of video data indicative of each visual source on a different portion of said touch screen display panel in real time;
   wherein visual data from at least one of the displayed visual sources is selectable for use by touch on an associated portion of the touch screen display panel, and
   wherein the touch screen display panel is configured to perform a transition in real time during a broadcast between visual data from a first visual source and visual data from a second visual source when a user touches an associated portion of the touch screen display panel that displays the live visual stream of data representing the first visual source and drags the touched portion of the touch screen directly onto a different portion of the touch screen display panel that displays the live visual stream of data representing the second visual source.

2. The broadcast control apparatus according to claim 1, further comprising:
   a touch screen graphical panel for the retrieval of control functions from a control function register,
   wherein visual data from at least one of the received and simultaneously displayed visual sources is selectable for use by touch on an associated portion of the touch screen display panel and the selected visual data is modifiable in accordance with a retrieved control function.

3. The broadcast control apparatus of claim 2, wherein the control function comprises at least one selected from a group consisting of a digital video effect and an audio effect.

4. The broadcast control apparatus according to claim 2, where the selected visual data is modifiable by touch on a portion of the touch screen graphical panel that is associated with the control function.

5. The broadcast control apparatus according to claim 2, where the control functions are executable in real time.

6. The broadcast control apparatus according to claim 1, further comprising a programmable panel having a plurality of programmable keys, each one of which is configured to be programmed to retrieve a control function.

7. The broadcast control apparatus according to claim 6, where a programmable key loaded with a control function appears back-lit with a first color indicating to an operator that the key is ready for operation and keys which have yet to be loaded and which are therefore available for programming appear backlit with a second color.

8. The broadcast control apparatus according to claim 7, where keys which are in operation appear backlit with a third color.

9. The broadcast control apparatus according to claim 6, further comprising a display module programmable to store a plurality of screen layout configurations.

10. The broadcast control apparatus according to claim 1, where the configuration of all the visual data from respective visual sources on the touch screen display panel is automatically resizable depending on the number of visual sources operating at any one time.

11. The broadcast control apparatus according to claim 1, further comprising a second touch screen display panel operable to receive and display further visual data or to view selected visual data for output.

12. The broadcast control apparatus according to claim 1, wherein the plurality of visual sources comprise at least one selected from a group consisting of video cameras, videotape recorders, disk servers, computer generated sources, and remote feeds.

13. The broadcast control apparatus according to claim 1, wherein the touch screen display panel is configured to playback more than one stream of visual data from a storage unit, the visual data sourced from the plurality of visual sources, where the touch screen display panel is configurable to display said respective streams of visual data on a different portion of said touch screen display panel.

14. The broadcast control apparatus according to claim 2, wherein the touch screen graphical panel is operable to build playlists and sequences, and
   where a sequence is built by effecting a transition between visual data from the first visual source and visual data from the second visual source, whereby finger pressure is applied on that associated portion of the touch screen display panel that displays the live visual stream of data representing the first visual source and dragging that visual source directly to a different portion of the touch screen display panel that displays the live visual stream of data representing the second visual source.

15. A system for broadcast control comprising:
   a touch screen display panel operable to receive and display live visual streams of video data simultaneously from a plurality of visual sources, where the touch screen display panel is configurable to display said live visual streams of video data indicative of each visual source on a different portion of said touch screen display panel in real time; and a storage unit for storing visual streams of video data from the plurality of visual sources; and a control panel in communication with the touch screen panel, the control panel including a plurality of programmable keys, each one of which is able to be programmed with a retrieved digital video effect, wherein playback of visual data from the storage unit is able to be modified in accordance with a retrieved control function, and wherein a transition between visual data from a first visual source and visual data from a second visual source are effected in real time during a broadcast by touch on an associated portion of the touch screen display panel that displays the live visual stream of data representing the first visual source and dragging the touched portion of the touch screen directly onto a different portion of the touch screen display panel that displays the live visual stream of data representing the second visual source.

16. The system according to claim 15, where the configuration of all the visual data from respective visual sources on the touch screen display panel is automatically resizable depending on the number of visual sources operating at the time.

17. A method for broadcast control comprising:

displaying on a touch screen display panel live visual streams of video data from a plurality of visual sources, said touch screen display panel configured to display said live visual streams of video data indicative of each visual source on a different portion of said touch screen display panel in real time;

receiving a selection of visual data from at least one of the displayed visual sources by touch on the associated portion of the touch screen display panel; and effecting a transition in real time during a broadcast between visual data from a first visual source and visual data from a second visual source when selection of an associated portion of the touch screen display panel that displays the live visual stream of data representative of the first visual source is touched and dragged directly onto another portion of the touch screen display panel that displays the live visual stream of data representative of the second visual source.

18. The method of claim 17, further comprising:

receiving a selection of a control function by touch on a corresponding portion of the display panel;

retrieving a control function from a control function register; and modifying the selected visual data with the retrieved control function to produce a first output cued for transmission.

19. The method of claim 17, further comprising:

storing a plurality of touch screen configurations for the touch screen display panel for displaying the plurality of visual sources and the control functions; and re-configuring the touch screen display panel according to one of the stored touch screen configurations.

20. The method of claim 17, further comprising:

automatically resizing the configuration of all the visual data from respective visual sources on the respective touch screen display panel depending on a change in the number of operating visual sources.

21. A broadcast control system for performing real time transitions between a plurality of visual sources during a broadcast, the system comprising:

a touch screen display panel operable to receive and display video data from a plurality of video sources that include at least one live video stream, wherein visual data indicative of the respective video sources is displayed on corresponding display portions of the touch screen display panel in real time; and a video source transition controller configured to perform a real-time transition during the broadcast of the at least one live video stream from the respective video source of the at least one live video stream to at least one other video source of the plurality of video sources when an operator of the broadcast control system touches the respective display portion for the visual data indicative of the at least one other video source during the broadcast causing the real-time transition from the at least one live video stream to the at least one other video source.

22. The broadcast control system according to claim 21, wherein the touch screen display panel displays the visual data indicative of the respective video sources in a matrix displaying the corresponding display portions.

23. The broadcast control system according to claim 21, wherein video source transition controller performs the real-time transition from the at least one live video stream to the at least one other video source when the operator touches and drags the respective display portion for the at least one live video stream to the respective display portion for the at least one other video source.

24. The broadcast control system according to claim 21, further comprising a touch screen graphical panel configured to retrieve at least one control function from a control function register, wherein the respective visual data simultaneously displayed for each of the respective video sources is selectable for use by the operator touching an associated portion of the touch screen display panel and the selected visual data is modifiable in accordance with a retrieved at least one control function.

25. The broadcast control system of claim 24, wherein the at least one control function comprises at least one of a digital video effect and an audio effect.

26. The broadcast control system according to claim 24, further comprising a visual data modifier that modifies the selected visual data by the operator touching a portion of the touch screen graphical panel associated with the control function.

27. The broadcast control system according to claim 24, wherein the at least one control function is executable in real time.

28. The broadcast control system according to claim 21, further comprising a programmable panel having a plurality of programmable keys that is each programmable to retrieve a control function.

29. The broadcast control system according to claim 28, wherein each programmable key programmed with a respective control function appears back-lit with a first color indicating to an operator that the key is ready for operation and each programmable key that has not yet been programmed and are available for programming appearing backlit with a second color.

30. The broadcast control system according to claim 21, wherein the display portions of the respective video sources displayed on the touch screen display panel are automatically resized depending on the number of video sources operating at any one time.

31. The broadcast control system according to claim 21, further comprising a second touch screen display panel operable to receive and display further visual data or to view selected visual data for output.

32. The broadcast control system according to claim 21, wherein the at least one other visual source of the plurality of video sources comprises at least one of another live video stream, a video camera, a videotape recorder, a disk server, a computer generated source, and a remote video feed.

\* \* \* \* \*